(12) United States Patent
Haraszti et al.

(10) Patent No.: US 7,427,020 B2
(45) Date of Patent: Sep. 23, 2008

(54) AUTHENTICATION METHOD AND SYSTEM

(75) Inventors: Attila Haraszti, Budapest (HU); Laszio Marsovszky, Budapest (HU)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 11/656,666

(22) Filed: Jan. 23, 2007

(65) Prior Publication Data

US 2007/0199991 A1    Aug. 30, 2007

Related U.S. Application Data

(62) Division of application No. 10/553,561, filed on Aug. 10, 2006.

(30) Foreign Application Priority Data

Apr. 30, 2003 (EP) .................... 03462003
Apr. 29, 2004 (EP) ............. PCT/EP2004/004538

(51) Int. Cl.
*G06K 5/00* (2006.01)
(52) U.S. Cl. .................. 235/380; 235/494; 235/375
(58) Field of Classification Search .......... 235/380, 235/487, 488, 375, 491, 494, 454
See application file for complete search history.

(56) References Cited

U.S. PATENT DOCUMENTS

| 4,218,674 | A | | 8/1980 | Brosow et al. | |
|---|---|---|---|---|---|
| 5,131,012 | A | | 7/1992 | Dravida | |
| 5,367,319 | A | * | 11/1994 | Graham | 347/2 |
| 5,974,150 | A | * | 10/1999 | Kaish et al. | 713/179 |
| 7,152,047 | B1 | * | 12/2006 | Nagel | 705/76 |
| 7,168,025 | B1 | * | 1/2007 | Berkovich | 714/759 |
| 2006/0028727 | A1 | * | 2/2006 | Moon et al. | 359/569 |
| 2006/0208089 | A1 | * | 9/2006 | Sadler et al. | 235/487 |

FOREIGN PATENT DOCUMENTS

| WO | WO 01/57831 A1 | 8/2001 |
|---|---|---|
| WO | WO 0250790 A1 | 6/2002 |

\* cited by examiner

*Primary Examiner*—Edwyn Labaze (57) ABSTRACT

The present invention relates to a method for determining the authenticity of an object, the method comprising the steps of:
  providing an authentication code,
  determining the positions of particles being distributed in an object,
  encoding of the positions to provide a check-code,
  using the check-code and the authentication-code to determine the authenticity of the object.

26 Claims, 6 Drawing Sheets

AUTHENTICATION METHOD AND SYSTEM

CROSS-REFERENCE TO RELATED APPLICATION

This application is a divisional application of copending U.S. utility application entitled, "Authentication Method and System," having Ser. No. 10/553,561, filed Aug. 10, 2006, which claims priority to PCT application entitled "Authentication Method and System", having Ser. No. PCT/EP2004/004538, filed Apr. 29, 2004, which claims priority to European patent application entitled "Authentication Method and System", having Ser. No. 03462003.9, filed Apr. 30, 2003, which applications are entirely incorporated herein by reference.

FIELD OF INVENTION

The present invention relates to the field of authentication techniques, and more particularly without limitation, to authentication of customer cards, financial transaction cards and copy protection.

BACKGROUND AND PRIOR ART

Various sealing and printing techniques to provide authentication and to avoid unauthorised replication of products and documents are known from the prior art. However, an increasing economic damage results from forgery due to insufficient security.

For authenticating documents and things U.S. Pat. No. 5,145,212 teaches the use of non-continuous reflective holograms or diffraction gratings. Such a hologram or diffraction grating is firmly attached to a surface that contains visual information desired to be protected from alteration. The reflective discontinuous hologram is formed in a pattern that both permits viewing the protected information through it and the viewing of an authenticating image or other light pattern reconstructed from it in reflection. In another specific authentication application of this U.S. Patent a non-transparent structure of two side-by-side non-continuous holograms or diffraction patterns, each reconstructing a separate image or other light pattern, increases the difficulty of counterfeiting the structure.

PCT application WO87/07034 describes holograms, including diffraction gratings, that reconstruct an image which changes as the hologram is tilted with respect to the viewer and in a manner that images reconstructed from copies made of the hologram in monochromatic light do not have that motion.

In UK Patent Application GB 2 093 404 sheet material items which are subject to counterfeiting have an integral or bonded authenticating device which comprises a substrate having a reflective diffractive structure formed as a relief pattern on a viewable surface thereon and a transparent material covering the structure. Specified grating parameters of the diffractive structure result in peculiar, but easily discernable, optical colour properties that cannot be copied by colour copying machines.

U.S. Pat. No. 4,661,983 describes a random-pattern of microscopic lines or cracks having widths in the order of micrometers that inherently forms in a di-electric coating layer of an authenticating device incorporated in a secure document. It permits identification of a genuine individual document by comparing read-out line-position information derived by microscopic inspection with read-out digital codes of line-information obtained earlier at the time of fabrication of the document.

U.S. Pat. No. 5,856,070 shows an authentication label containing a light diffracting structure. Unique parameters are randomly defined in the light diffracting structure by anisotropic process steps not under full control of the producer during the manufacturing of the diffracting structure to prevent copying or creating an exact replica thereof. The resultant uniquely coloured authenticating pattern can be verified by simple observation with the naked eye.

U.S. Pat. No. 4,218,674 shows an authentication method and system that uses an object being of base material having random imperfections. The random imperfections are converted into pulses along a predetermined measuring track over the surface of the object of base material. WO01/57831 shows a similar method that uses random gas enclosures in an authentication object.

SUMMARY OF THE INVENTION

The present invention provides for an authentication method which is based on an authentication object, such as an authentication label, having a three-dimensional pattern of randomly distributed particles. The positions of the particles are measured and used to provide an authentication code for a user.

When the authenticity of the object needs to be checked the positions of the particles in the object can be determined and used again to provide a check-code. The authentication code and the check-code can be used to determine whether the object is authentic or not. For example, if the authentication code and the check-code are identical, this means that the object is an original and not and unauthorised copy.

In accordance with a preferred embodiment of the invention only the two-dimensional positions of the particles are used for the encoding. In this case the authentication requires a step to determine whether the object carries in fact a three-dimensional pattern of particles in order to ensure that the object is not a two-dimensional copy of the original three-dimensional object. This provides protection against two dimensional replication techniques, such as photocopying.

In accordance with a further preferred embodiment of the invention a check-sum is generated as an authentication code. For example, the position data of the particles is concatenated to form a polynomial. The polynomial is divided by a generator polynomial, which provides a cyclic redundancy check-sum. This check-sum can be used as an authentication code.

In accordance with a further preferred embodiment of the invention a hashing scheme is used for encoding of the positions to provide the authentication code.

In accordance with a further preferred embodiment of the invention the authentication object is retroreflective. The retroreflective effect is caused by the random distribution of particles, such as optical lens elements, within the object. The presence of a three-dimensional pattern of particles within the object can therefore be tested by checking whether the object is retroreflective or not.

In accordance with a further preferred embodiment of the invention, the authentication object is produced from a reflective tape or sheeting. Such reflective tapes or sheetings are as such known from the prior art and are commonly used for reflective vehicle markings and reflective construction work zone signs. In particular, Scotchlite, which is commercially available from 3M, can be used for providing an authentication object of the invention.

The present invention is particularly advantageous as it facilitates to provide an inexpensive authentication object which features a high level of security as the authentication is based on a three-dimensional distribution pattern of the particles within the authentication object, which is most difficult if not impossible to replicate. Preferably the three-dimensional distribution pattern has a random or pseudo random statistical distribution of the particles. Applications of the present invention include customer cards, financial transaction cards, automatic teller machine (ATM) cards and copy protection labels for data carriers, such as CDs and DVDs.

BRIEF DESCRIPTION OF THE DRAWINGS

In the following, preferred embodiments of the invention will be described, by way of example only, and with reference to the drawings, in which.

DETAILED DESCRIPTION

Figure 1:
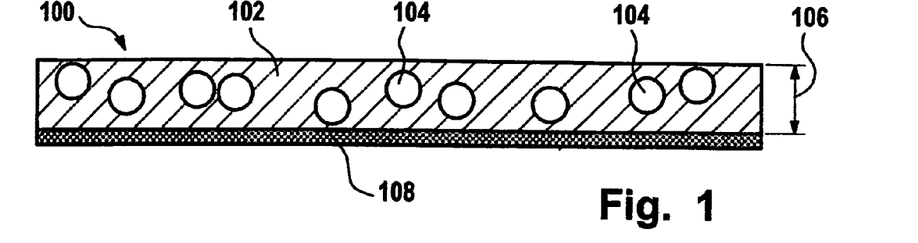
FIG. 1 is illustrative of a first embodiment of an authentication label.

FIG. 1 shows authentication label 100. Authentication label 100 has carrier layer 102 with embedded particles 104. The particles 104 are randomly distributed within carrier layer 102, such that the positions of the particles 104 within carrier layer 102 define a random three-dimensional pattern.

Carrier layer 102 consists of a translucent or transparent material, such as a synthetic resin or transparent plastic material, which enables to optically determine the positions of particles 104. For example, carrier layer 102 has a thickness 106 of between 0.3 to 1 mm or any other convenient thickness.

Particles 104 can be glass beads or balls, or disks, metallic or pearlescent pigments with or without a light reflecting coating or any other convenient form or type of particle. The particles can be optically detected due to their reflective coating, or in the absence of such reflective coating, due to their reflection coefficient, which is different to the material of the carrier layer 102. Preferably particles 104 are 5 to 200 micrometers in diameter. For example, particles 104 can be optical lens elements to provide the authentication label 100 with a reflective effect.

Preferably authentication label has adhesive layer 108 in order to glue authentication label 100 to a product or document. The material properties of carrier layer 102 and adhesive layer 108 are chosen such that an attempt to remove authentication label 100 from the product or document would result in destruction of authentication label 100.

Figure 2:
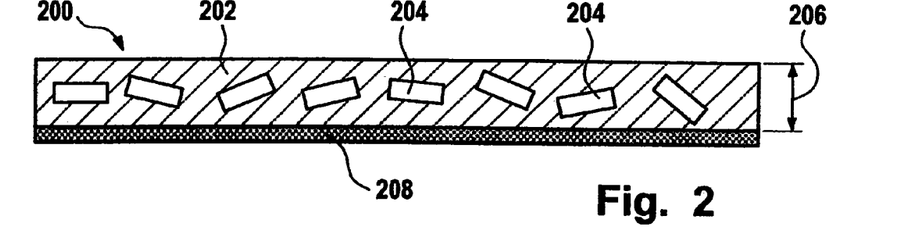
FIG. 2 is illustrative of a second embodiment of an authentication label.

FIG. 2 shows an alternative embodiment, where like reference numerals are used to designate like elements as in FIG. 1. In the embodiment of FIG. 2 particles 204 within carrier layer 202 of authentication label 200 are metallic or pearlescent pigments. Again the thickness 206 of carrier layer 202 is about 0.3 to 1 mm or any other convenient thickness.

For example, authentication label 200 has the size of a post stamp, which is 3×4 mm and contains about two hundred particles 204. The random distribution of the two hundred particles within carrier layer 202 provides a sufficient uniqueness of authentication label 200.

Figure 3:
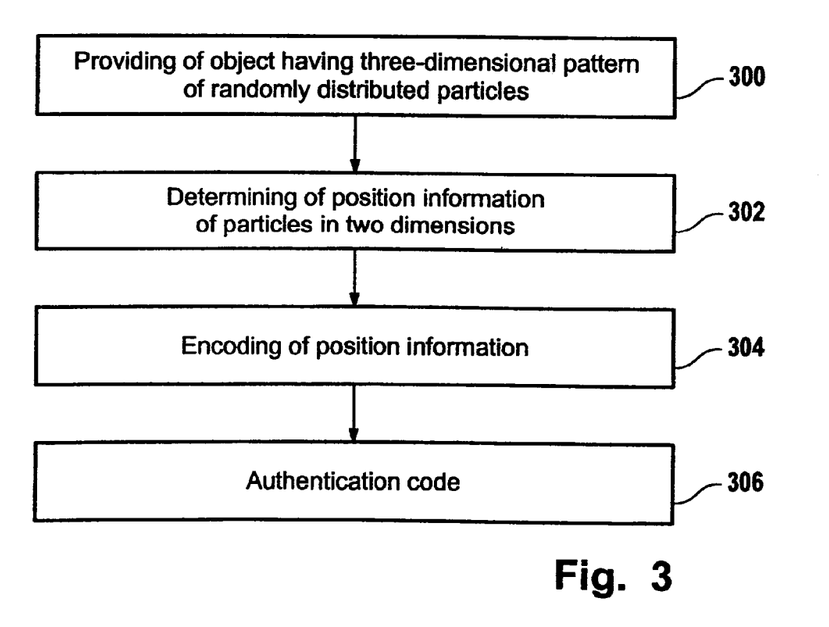
FIG. 3 is illustrative of a flow chart for generating an authentication code for an authentication label.

FIG. 3 shows a flow chart for generating an authentication code based on the positions of the particles in an authentication object, such as an authentication label as described in FIGS. 1 and 2.

In step 300 an authentication object having a three-dimensional pattern of randomly distributed particles is provided. For example, the authentication object is a piece of Scotchlite tape, which is commercially available from 3M.

In step 302 the positions of the particles, which are embedded in the authentication object are determined in two dimensions. This can be done by acquiring an image of the object and automatically determining the position information by means of image processing.

In step 304 the position information acquired in step 302 is encoded. This can be done by generating a check-sum or a hash-key on the basis of the position information. For example, a cyclic redundancy check (CRC) check-sum is calculated to provide the authentication code. This can be done by sorting of the measured x,y coordinates of the positions of the particles by the x-coordinate. The y-coordinate values are concatenated in the order as determined by the sorting to provide a polynomial, which is divided by the generator polynomial of the CRC encoding.

For example a standard CRC-32 Polynom can be used as a generator polynomial as it is as such known for Ethernet, Infiniband, FibreChannel, and ATM transmissions ($x^{32}+x^{26}+x^{23}+x^{22}+x^{16}+x^{12}+x^{11}+x^{10}+x^8+x^7+x^5+x^4+x^2+x^1+1$). The result of this polynomial division is the authentication code for the authentication object, which is output in step 306.

In order to increase the stability of the encoding, the y-coordinate values are shifted by a number of bit positions, such as four bits, to the left before the concatenation. For example, only the four most significant bits of each y-coordinate value are used for the concatenation.

Figure 4:
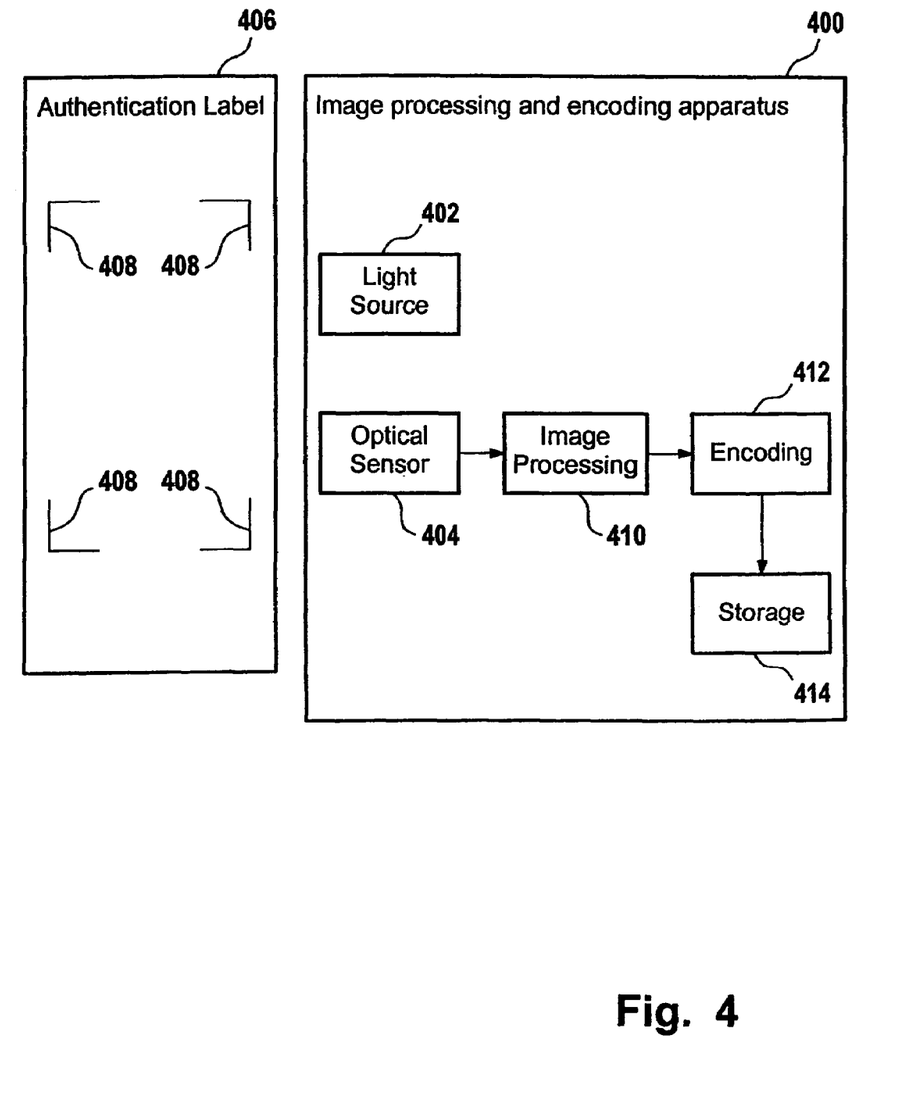
FIG. 4 is block diagram of an image processing and encoding apparatus for generating of an authentication code for an authentication label.

FIG. 4 shows a block diagram of image processing and encoding apparatus 400. Image processing and encoding apparatus 400 has light source 402 and optical sensor 404 for taking an image of authentication label 406. For example, authentication label 406 has a similar design as authentication label 100 (cf. FIG. 1) and authentication label 200 (cf. FIG. 2). In addition, authentication label 406 has position markers 408, which relate authentication label 406 to a reference position.

Optical sensor 404 is coupled to image processing module 410. Image processing module 410 has an image processing program, which can determine the positions of the particles contained in authentication label 406 from the image data delivered by optical sensor 404.

Image processing module 410 is coupled to encoding module 412. Encoding module 412 receives two-dimensional coordinate values from image processing module 410 in accordance with the two-dimensional position information extracted by the image processing module 410 from the image data. Encoding module 412 encodes the two-dimensional coordinate values to provide a check-sum, hash key or another codeword being related to the two-dimensional distribution of the particles within authentication label 406.

Encoding module 412 is coupled to a storage 414 in order to store the result of the encoding for later usage. For example, the image processing and encoding is done for a sequence of authentication labels for the purpose of mass production.

In this case a sequence of authentication codes is stored in storage 414 during the mass production. These authentication codes can be printed and mailed to the users independently from the mailing of the authentication labels 406. For example, the authentication labels 406 are attached to customer cards or financial transaction cards, such as ATM-cards, which are mailed to the customers. The customers receive by separate mail the corresponding authentication codes.

Figure 5:
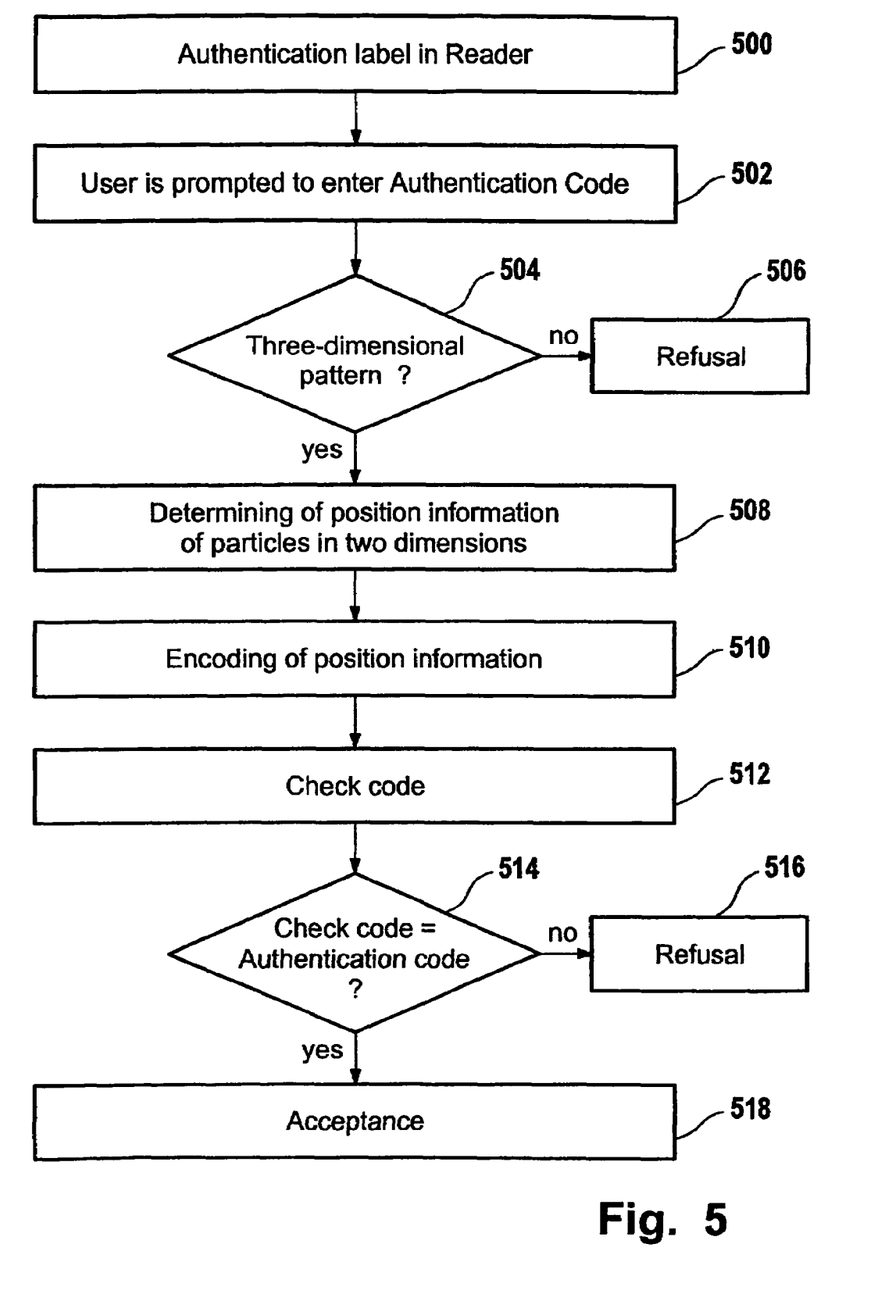
FIG. 5 is illustrative of a flow diagram for determining the authenticity of an authentication label.

FIG. 5 shows an authentication method, which is based on an authentication label as explained above. In step 500 e.g. an authentication card with an attached authentication label, is inserted into a card reader. In step 502 the user is prompted to enter his or hers authentication code into the card reader.

In step 504 the card reader makes a determination whether the authentication label has a three-dimensional pattern of particles or not. This can be done by various methods. Preferred embodiments of how this determination can be accomplished, will be explained in more detail by making reference to the FIGS. 6, 7 and 8 below.

If it is determined in step 504 that there is no three-dimensional pattern of distributed particles in the authentication label, a corresponding refusal message is outputted by the card reader in step 506.

If the contrary is true, the authentication procedure goes on to step 508, where the position information of the particles, which are distributed in the authentication label, is determined. As is has been determined before that there is in fact a three-dimensional distribution pattern of the particles it is sufficient to determine the position information in only two dimensions.

In step 510 the position information is encoded in order to provide a check code in step 512, which is representative of the combined position information determined in step 508.

In step 514 it is determined whether the check code is the same as the authentication code, which has been entered by the user in step 502. If this is not the case, a refusal message is outputted by the card reader in step 516. Alternatively, noise is added to the position information determined in step 508 to vary the position information within the measurement tolerance. If multiple attempts to generate a check code based on the varied position information which matches the authentication code have failed a final determination is made that a refusal message needs to be outputted.

If it is determined in step 514, that the check code matches the authentication code an acceptance message is outputted in step 518. Alternatively, an action is performed or enabled depending on the field of application of the authentication method, such as banking, access control, financial transaction, or copy protection.

Figure 6:
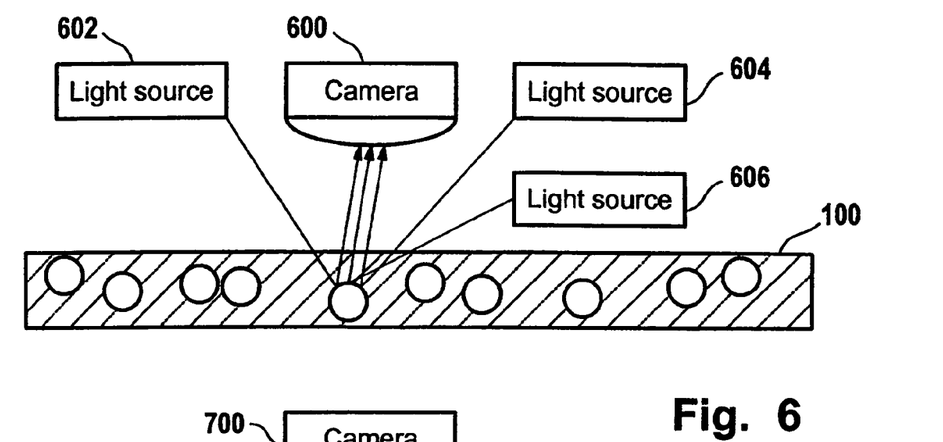
FIG. 6 is illustrative of a method for determining if the authentication label has a three-dimensional pattern of distributed particles.

FIG. 6 illustrates one preferred method for determining whether there is a three-dimensional pattern of particles within the authentication label (cf. step 504 of FIG. 5). This step serves to ensure that a two-dimensional copy of the original authentication label would lead to a refusal.

FIG. 6 shows authentication label 100 (cf. FIG. 1). In order to determine whether there is a three-dimensional pattern of particles within authentication label 100 or not three images of authentication label 100 are taken in a sequence by means of camera 600. The first image is taken with diffuse light source 602 switched on and diffuse light sources 604 and 606 switched off.

The second image is taken with light sources 602 and 606 switched off, while light source 604 illuminates authentication label 100 from a different illumination angle. Likewise the third image is taken with light sources 602 and 604 switched off, while light source 606 illuminates authentication label 100 from still another illumination angle.

The three images are combined to provide a resulting image. The combination can be done by digitally superimposing and adding the digital images. If there is in fact a three-dimensional distribution pattern of particles within authentication label regular geometric artefacts must be present in the resulting image. In the case of three light sources the geometric artefacts, which are produced, are triangles of similar size and shape. This effect is not reproducible by means of a two-dimensional copy of the original authentication label 100.

As an alternative, more than three light sources at different illumination angles can be used for taking a corresponding numbers of images, which are superposed and added. Changing the number of the light sources also changes the shape of the geometric artefact in the resulting image.

Figure 7:
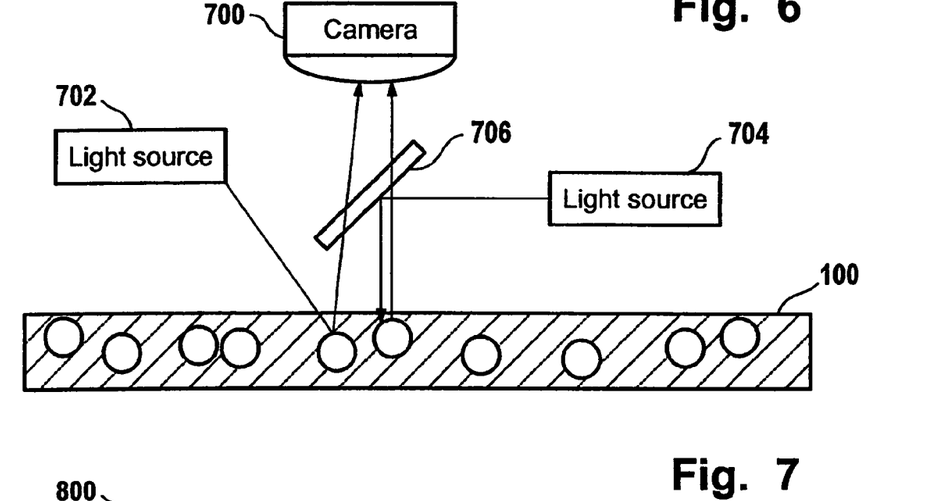
FIG. 7 is illustrative of an alternative method for determining if the authentication label has a three-dimensional pattern of distributed particles.

FIG. 7 shows an alternative method for determining the three-dimensionality of the distribution pattern of the particles within authentication label 100. For this application it is required, that authentication label 100 is reflective. The under-lying principle is that the reflective effect can not be reproduced by means of two-dimensional copy of the authentication label 100.

The test, whether authentication label 100 is in fact reflective or not, is done as follows: a first image is taken by camera 700 with diffuse light source 702 switched on. The diffuse light source 702 will not invoke the reflective effect. The second image is taken with diffuse light source 702 switched off and direct light source 704 switched on.

By means of half mirror 706 this produces an incident light beam, which is about perpendicular to the surface of authentication label 100. This light beam invokes the reflective effect. By comparing the first and the second images it is apparent whether authentication label 100 is reflective or not. This distinction can be made automatically by means of a relatively simple image processing routine.

Figure 8:
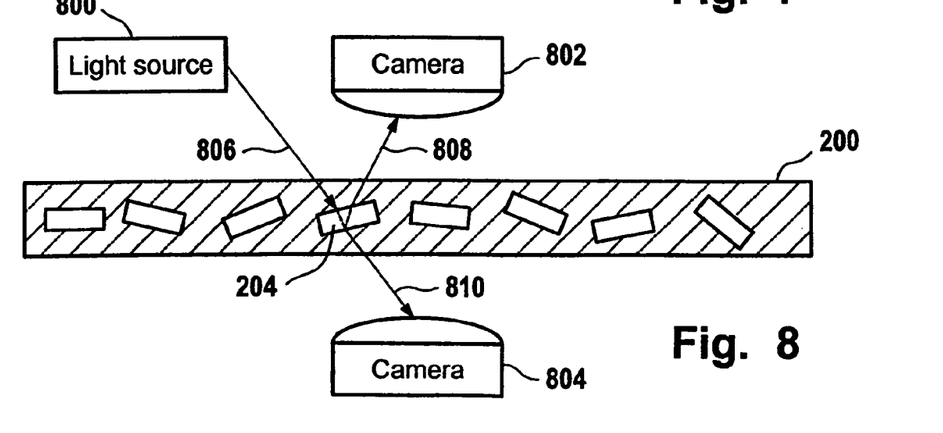
FIG. 8 is illustrative of a further alternative method for determining if the authentication label has a three-dimensional pattern of distributed particles.

FIG. 8 shows a further alternative method for determining whether the distribution pattern of particles is three-dimensional or not. This method requires that the particles within authentication label 200 (cf. FIG. 2) are pearlescent pigments.

Presently, mica pigments coated with titanium dioxide and/or iron oxide are safe, stable and environmentally acceptable for use in coating, cosmetics and plastics. The pearlescent effect is produced by the behavior of incident light on the oxide coated mica; partial reflection from and partial transmission through the platelets create a sense of depth. The color of the transmitted light is complementary to the color of the reflected light.

To check the presence of this colour effect, light source 800 producing diffuse, white light and two cameras 802 and 804 are used. The cameras 802 and 804 are positioned at opposite sides of authentication label 200.

An incident light beam 806 is partly reflected by particle 204 into reflected light beam 808 and partly transmitted as transmitted light beam 810. If the colours of reflected light beam 808 and transmitted light beam 810 are complementary this means that authentication label 200 could not have been produced by two-dimensional copying.

The test whether the colours of reflected light beam 808 and transmitted light beam 810 are complementary can be made by summing the colour coordinate values e.g. using the RGB colour coordinate system. The summation of the colour coordinates must result in roughly a constant RGB value.

Figure 9:
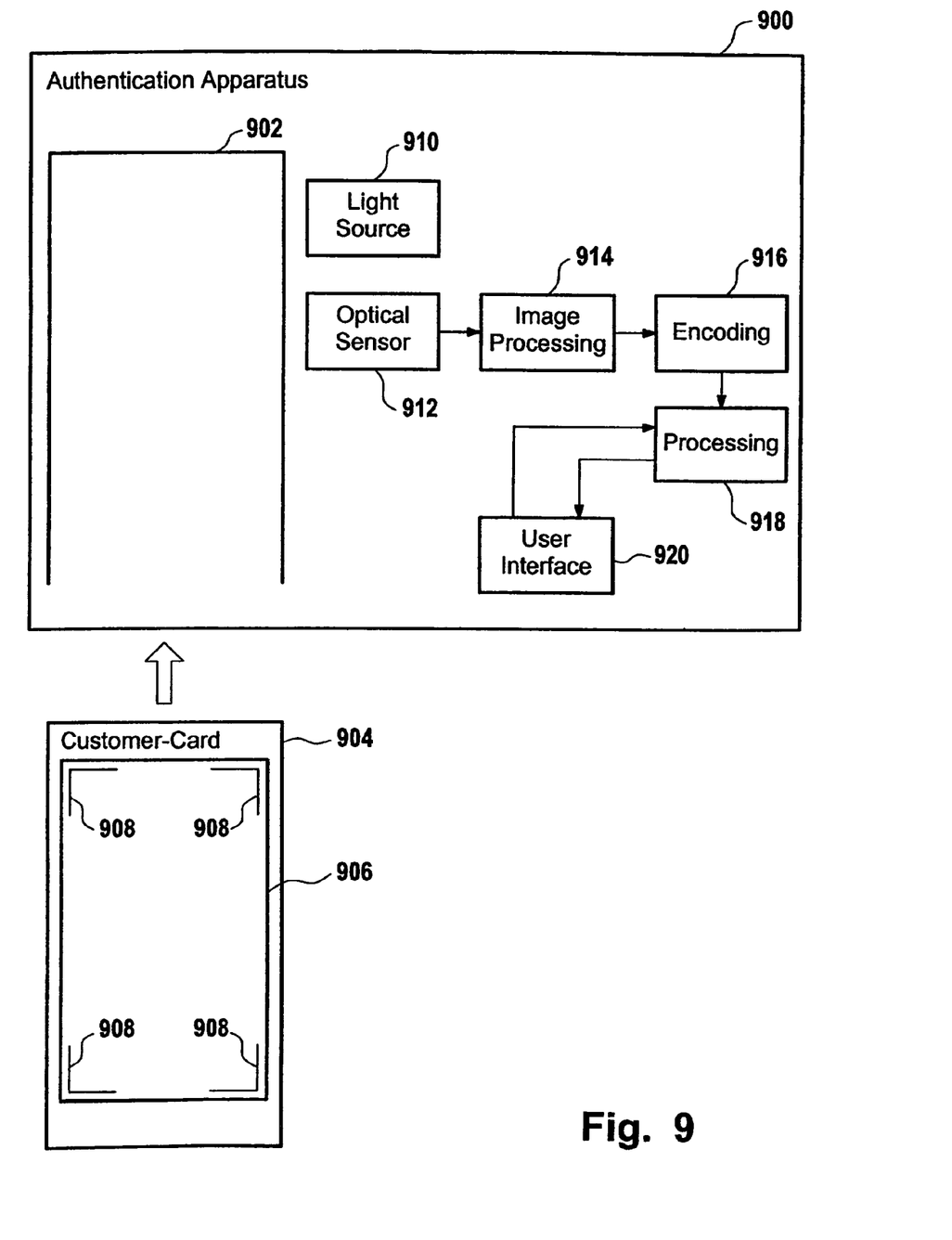
FIG. 9 shows a block diagram of an authentication apparatus for determining the authenticity of an authentication label.

FIG. 9 shows a block diagram of authentication apparatus 900. Authentication apparatus 900 has slot 902 with mechanical guides for insertion of customer card 904. Customer card 904 carries authentication label 906, which is similar to authentication label 100 (cf. FIG. 1) or authentication label 200 (cf. FIG. 2).

Authentication label 906 is attached to the surface of customer card 904 by an adhesive or is integrated within the card. In this instance the surface of customer card 904 must be transparent in order to enable to take an image of the surface of authentication label 906. For example, customer card 904 is made of a flexible, transparent plastic that has a smooth outer surface and which envelopes authentication label 906.

Authentication label 906 has position markers 908, which relate authentication label 906 to a reference position.

Authentication apparatus 900 has at least one light source 910 for illumination of authentication label 906, when customer card 904 is inserted into slot 902.

Further, authentication apparatus 900 has optical sensor 912, such as a CCD camera. Optical sensor 912 is coupled to image processing module 914. Image processing 914 is equivalent to image processing module 410 of FIG. 4, i.e. it provides position information of the particles to encoding module 916. The encoding scheme used in encoding module 916 is the same as the one which is used in the image processing ending coding apparatus, which has been used to produce the authentication code for customer card 904 (cf. encoding module 412 in FIG. 4).

Authentication apparatus 900 has processing module 918, which provides user interface 920.

In operation, a customer inserts his or her customer card 904 into slot 902. In response, one or more images at different illumination angles are taken from authentication label 906, which are provided from optical sensor 912 to image processing module 914.

Image processing module 914 detects position markers 908 in an image, which has been taken by means of optical sensor 912. The positions of position markers 908 indicate a dislocation of the authentication label within slot 902 with respect to the reference position. This dislocation is caused by mechanical tolerances of the customer card 904 and/or of slot 902. Image processing module performs a projective transformation of the image data in order to compensate the dislocation.

Next a determination is made if there is a three dimensional distribution pattern of particles within authentication label 906. This is done by means of any of the above-described methods performed by image processing module 914.

When a three dimensional distribution pattern is detected, image processing module 914 determines the x,y-coordinate values of the particle positions. These coordinate values are provided to encoding module 916, which generates a check-code as a result of the encoding. The check-code is entered into processing module 918.

Processing module 918 prompts the user via user interface 920 to enter his or her authentication code. Processing module 918 compares the check-code and the authentication code in order to make a determination whether the customer card 904 is in fact authentic or not. In case customer card 904 needs to be refused, a corresponding message is output on user interface 920.

Figure 10:
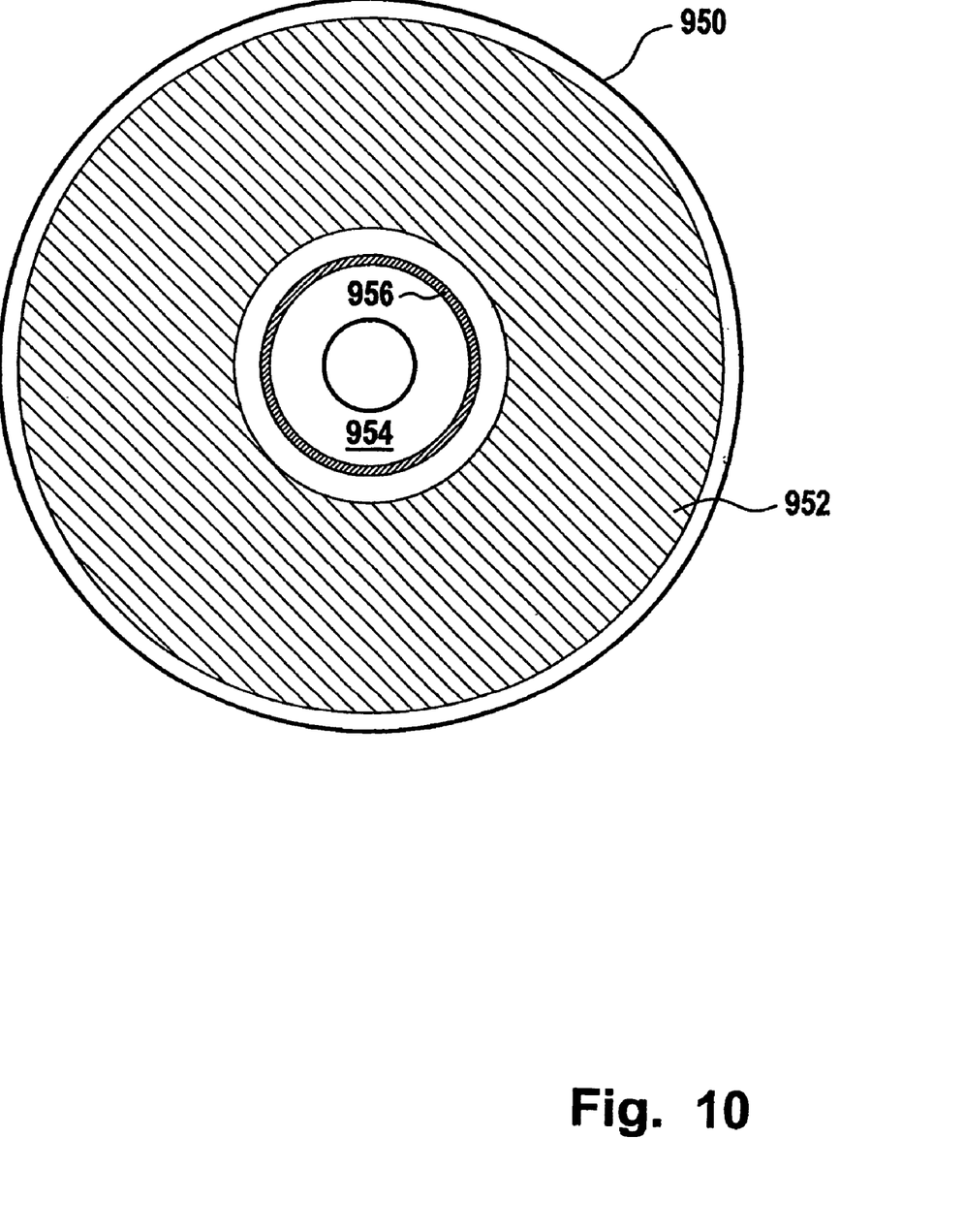
FIG. 10 shows an optical recording medium with an attached or integrated authentication label.

FIG. 10 is illustrative of another field of application of the present invention for the purposes of copy protection. FIG. 10 shows optical disk 950, such as a CD or DVD. The optical disk 950 has an area 952, which is covered by a data track. Outside area 952, such as within inner area 954, an annularly shaped authentication label 956 is glued to the surface of optical disk 950 or integrated within optical disk 950. Again authentication label 956 is similar to authentication label 100 (cf. FIG. 1) or authentication label 200 (cf. FIG. 2).

When a user desires to use the optical disk 950, he or she puts optical disk 950 into a player or disk drive. In response, the user is prompted to enter the authentication code for usage of optical disk 950. The player or disk drive determines the check code for authentication label 956 and makes a determination whether optical disk 950 is an original or an unauthorized copy based on a comparison of the check code and the authentication code. This can be done in accordance with the method steps as explained above with respect to FIG. 5.

REFERENCE NUMERALS authentication label
102 carrier layer
104 particles
106 thickness
108 adhesive layer
200 authentication label
202 carrier layer
204 particles
206 thickness
208 adhesive layer
400 image processing and encoding apparatus
402 light source
404 optical sensor
406 authentication label
408 position makers
410 image processing module
412 encoding module
414 storage
600 camera
602 light source
604 light source
606 light source
700 camera
702 diffuse light source
704 direct light source
706 half mirror
800 light source
802 camera
804 camera
806 light beam
808 reflected light beam
810 transmitted light beam
900 authentication apparatus
902 slot
904 customer card
906 authentication label
908 position marker
910 light source
912 optical sensor
914 image processing module
916 encoding module
918 processing module
920 user interface
950 optical disk
952 area 954 inner area
956 authentication label

The invention claimed is:

1. A method for determining the authenticity of an object, the method comprising the steps of:
- receiving an authentication code,
- determining if particles are distributed within the object in a three-dimensional pattern by checking if the object is retroreflective,
- determining positions of particles being distributed in the object,
- using of the positions to provide a check-code,
- using the check-code and the authentication-code to determine the authenticity of the object.

2. The method of claim 1, further comprising determining if the particles are distributed within the object in a three-dimensional pattern, whereby the positions of the particles are determined using a two-dimensional image of the object.

3. The method of claim 1 the determination if the particles are distributed in a three-dimensional pattern being performed by the steps of:
- acquiring of a first image of the object with a first angle of illumination,
- acquiring a second image of the object with a second angle of illumination,
- combining of the first and second images,
- determining if a geometrical artifact is present in the combined images.

4. The method of claim 1, whereby it is determined whether the object is retroreflective by acquiring a first image with diffuse illumination of the object and acquiring a second image with direct illumination of the object and comparing a brightness of the object in the first and second images.

5. The method of claim 1, the determination if the particles are distributed in a three-dimensional pattern being performed by the steps of:
- illuminating of the object with diffuse, white light,
- detecting light reflected from the object and light transmitted through the object, and
- determining, if the reflected light and the transmitted light have complementary colors.

6. The method of claim 1, further comprising the steps of:
- acquiring an image of the object in a read position,
- determining a dislocation of the read position with respect to a reference position by detecting of marker positions in the image, and
- performing a projective transformation of the image for compensation of the dislocation.

7. The method of claim 1, the check code being provided by:
- determining the positions of the particles,
- using of the positions to provide the check code.

8. The method of claim 7, whereby the positions of the particles are determined using a two-dimensional image of the object and whereby the check code is provided by encoding of the positions.

9. The method of claim 8, further comprising determining a polynomial based on the positions, whereby the encoding of the positions is performed by dividing the polynomial by a generator polynomial.

10. The method of claim 9, whereby the polynomial is determined by sorting of the positions by a sorting criterion and using the sorted positions to obtain the polynomial.

11. The method of claim 10, whereby the sorting criterion is applied to first coordinate values of the positions, and whereby only the second coordinate values of the sorted positions are used to obtain the polynomial.

12. The method of claim 11, whereby the polynomial is determined by shifting of the second coordinate values by a pre-determined number of bit positions and by concatenating most significant bits of the shifted coordinate values in the order as determined by the sorting of the positions.

13. The method of claim 1, further comprising providing position data descriptive of the determined positions, and wherein the check-code is provided by encoding the position data by means of a hashing method.

14. An authentication device comprising:
- means for determining the positions of particles being distributed within an object in a three-dimensional pattern,
- means for determining if the particles are distributed within the object in three dimensions by checking if the object is retroreflective,
- means for encoding of the positions to provide a check-code,
- means for entering of an authentication code,
- means for determining the authenticity of the object based on the check-code and the authentication code.

15. The authentication device of claim 14, further comprising means for determining if the particles are distributed within the object in three dimensions, and whereby the means for determining the positions of the particles are adapted to determine the positions in two dimensions.

16. The authentication device of claim 14, the means for determining the positions of particles comprising image processing means adapted to perform a projective transformation of an image in order to compensate for a dislocation of the image with respect to a reference position.

17. The authentication device of claim 16, the image processing means being adapted to determine the dislocation by determining of marker positions in the image.

18. A card reader for authenticating a customer card, the customer card having an authentication label carrying a three-dimensional pattern of randomly distributed particles, the card reader comprising:
- apparatus for determining if the particles are distributed within the authentication label in three dimensions by checking if the authentication label is retroreflective and for determining the positions of particles,
- an encoder for encoding of the determined positions to provide a check-code,
- an interface for receiving an authentication code,
- a processor for determining the authenticity of the object based on the check-code and the authentication code.

19. An electronic device for reading of a data carrier, the data carrier having a copy protection label, the copy protection label carrying a three-dimensional pattern of distributed particles, the electronic device comprising:
- an optical sensor for determining if the particles are distributed within the copy protection label in three dimensions by checking if the copy protection label is retroreflective and for determining the positions of particles,
- an encoder for encoding of the determined positions to provide a check-code,
- an interface for receiving an authentication code,
- a processor for determining the authenticity of the object based on the check-code and the authentication code.

20. An electronic device for authentication of an object comprising:
- an apparatus for determining if the object has a three-dimensional pattern of distributed particles by checking if the object is retroreflective, a measurement component for determining the positions of particles, an encoding apparatus for encoding the determined positions to provide a check-code, an interface for receiving an authentication code, a processor for determining the authenticity of the object based on the check-code and the authentication code.

21. The electronic device of claim 20, the measurement component comprising an image processing component.

22. The electronic device of claim 20, the measurement component operable to determine the positions in two dimensions.

23. The electronic device of claim 22, the apparatus being operable to:
  illuminate the object with diffuse, white light,
  detect light reflected from the object and light transmitted through the object, and
  determine if the reflected light and the transmitted light have complementary colors.

24. The electronic device of claim 22, further comprising:
  an image acquisition apparatus for acquiring an image of the object in a read position,
  an image processing apparatus for determining a dislocation of the read position with respect to a reference position by detecting marker positions in the image and for performing a projective transformation of the image for compensation of the dislocation.

25. The electronic device of claim 22, wherein the measurement component is adapted to determine the positions of the particles using a two-dimensional image of the object and the encoding apparatus being adapted to provide the check-code by encoding the positions.

26. The electronic device of claim 20, the encoding apparatus operable to determine a polynomial based on the positions, wherein the encoding of the positions is performed by dividing the polynomial by a generator polynomial.

* * * * *

UNITED STATES PATENT AND TRADEMARK OFFICE
CERTIFICATE OF CORRECTION

PATENT NO. : 7,427,020 B2  Page 1 of 1
APPLICATION NO. : 11/656666
DATED : September 23, 2008
INVENTOR(S) : Attila Haraszti et al.

It is certified that error appears in the above-identified patent and that said Letters Patent is hereby corrected as shown below:

In column 10, line 11, in Claim 14, after "determining" delete "the".

In column 10, line 43, in Claim 18, after "determining" delete "the".

In column 10, line 56, in Claim 19, after "determining" delete "the".

In column 11, line 1, in Claim 20, after "determining" delete "the".

Signed and Sealed this

Thirty-first Day of March, 2009

JOHN DOLL
*Acting Director of the United States Patent and Trademark Office*